United States Patent
Weissmann et al.

(10) Patent No.: US 10,503,517 B2
(45) Date of Patent: *Dec. 10, 2019

(54) METHOD FOR BOOTING A HETEROGENEOUS SYSTEM AND PRESENTING A SYMMETRIC CORE VIEW

(71) Applicant: Intel Corporation, Santa Clara, CA (US)

(72) Inventors: Eliezer Weissmann, Haifa (IL); Rinat Rappoport, Haifa (IL); Michael Mishaeli, Haifa (IL); Hisham Shafi, Haifa (IL); Oron Lenz, Haifa (IL); Jason W. Brandt, Austin, TX (US); Stephen A. Fischer, Gold River, CA (US); Bret L. Toll, Hillsboro, OR (US); Inder M. Sodhi, Folsom, CA (US); Alon Naveh, Ramat Hasharon (IL); Ganapati N. Srinivasa, Portland, OR (US); Ashish V. Choubal, Austin, TX (US); Scott D. Hahn, Portland, OR (US); David A. Koufaty, Portland, OR (US); Russel J. Fenger, Beaverton, OR (US); Gaurav Khanna, Hillsboro, OR (US); Eugene Gorbatov, Hillsboro, OR (US); Mishali Naik, Santa Clara, CA (US); Andrew J. Herdrich, Hillsboro, OR (US); Abirami Prabhakaran, Hillsboro, OR (US); Sanjeev S. Sahagirdar, Folsom, CA (US); Paul Brett, Hillsboro, OR (US); Paolo Narvaez, Wayland, MA (US); Andrew D. Henroid, Portland, OR (US); Dheeraj R. Subbareddy, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 67 days.

This patent is subject to a terminal disclaimer.

(21) Appl. No.: 15/672,254

(22) Filed: Aug. 8, 2017

(65) Prior Publication Data

US 2018/0060078 A1    Mar. 1, 2018

Related U.S. Application Data

(63) Continuation of application No. 13/854,001, filed on Mar. 29, 2013, now Pat. No. 9,727,345.

(Continued)

(51) Int. Cl.
    *G06F 9/44*    (2018.01)
    *G06F 9/50*    (2006.01)
    (Continued)

(52) U.S. Cl.
    CPC ........ *G06F 9/4401* (2013.01); *G06F 9/45558* (2013.01); *G06F 9/5077* (2013.01);
    (Continued)

(58) Field of Classification Search
    CPC ..... G06F 9/4401; G06F 9/5094; G06F 9/5077
    See application file for complete search history.

(56) References Cited

U.S. PATENT DOCUMENTS

| 4,377,000 A | 3/1983 | Staab |
| 5,642,506 A | 6/1997 | Lee |

(Continued)

FOREIGN PATENT DOCUMENTS

| KR | 20070049226 A | 5/2007 |
| KR | 20080038389 A | 5/2008 |

(Continued)

OTHER PUBLICATIONS

Examination Report from foreign counterpart Great Britain Patent Application No. GB1404549.6, dated Feb. 23, 2016, 2 pages.

(Continued)

*Primary Examiner* — Stefan Stoynov
(74) *Attorney, Agent, or Firm* — Nicholson De Vos Webster & Elliott LLP

(57) ABSTRACT

A heterogeneous processor architecture and a method of booting a heterogeneous processor is described. A processor (Continued)

according to one embodiment comprises: a set of large physical processor cores; a set of small physical processor cores having relatively lower performance processing capabilities and relatively lower power usage relative to the large physical processor cores; and a package unit, to enable a bootstrap processor. The bootstrap processor initializes the homogeneous physical processor cores, while the heterogeneous processor presents the appearance of a homogeneous processor to a system firmware interface.

15 Claims, 13 Drawing Sheets

Related U.S. Application Data

(60) Provisional application No. 61/801,615, filed on Mar. 15, 2013.

(51) Int. Cl.
*G06F 9/455* (2018.01)
*G06F 9/4401* (2018.01)

(52) U.S. Cl.
CPC ............ *G06F 9/5094* (2013.01); *Y02D 10/22* (2018.01); *Y02D 10/36* (2018.01)

(56) References Cited

U.S. PATENT DOCUMENTS

| | | | |
|---|---|---|---|
| 6,341,347 B1 | 1/2002 | Joy et al. | |
| 7,272,517 B1 | 9/2007 | Brey et al. | |
| 7,461,275 B2 | 12/2008 | Belmont et al. | |
| 7,490,254 B2 | 2/2009 | Clark | |
| 7,634,650 B1 | 12/2009 | Shah et al. | |
| 7,797,512 B1 | 9/2010 | Cheng et al. | |
| 7,802,073 B1 | 9/2010 | Cheng et al. | |
| 7,822,941 B2 | 10/2010 | Vick et al. | |
| 8,214,675 B2* | 7/2012 | Challener | G06F 1/263 713/324 |
| 8,650,426 B2* | 2/2014 | Rychlik | G06F 1/3203 713/323 |
| 9,009,508 B2* | 4/2015 | Beck | G06F 1/3203 713/320 |
| 9,032,226 B2 | 5/2015 | Kumar et al. | |
| 9,092,219 B2 | 7/2015 | Naffziger et al. | |
| 2003/0200413 A1 | 10/2003 | Gurumoorthy et al. | |
| 2004/0024987 A1 | 2/2004 | Lentz et al. | |
| 2005/0013705 A1 | 1/2005 | Farkas et al. | |
| 2005/0268048 A1 | 12/2005 | Hofstee et al. | |
| 2006/0004942 A1 | 1/2006 | Hetherington et al. | |
| 2006/0095807 A1 | 5/2006 | Grochowski et al. | |
| 2006/0139360 A1 | 6/2006 | Panesar et al. | |
| 2006/0156042 A1 | 7/2006 | Desai et al. | |
| 2006/0236135 A1 | 10/2006 | Jones | |
| 2008/0270713 A1 | 10/2008 | Hornung et al. | |
| 2009/0119449 A1 | 5/2009 | Nagaram | |
| 2009/0177864 A1 | 7/2009 | Moreton et al. | |
| 2009/0187777 A1 | 7/2009 | Clark | |
| 2009/0249094 A1 | 10/2009 | Marshall et al. | |
| 2009/0309243 A1 | 12/2009 | Carmack et al. | |
| 2010/0174923 A1 | 7/2010 | Houlihan et al. | |
| 2010/0186010 A1 | 7/2010 | Chalemin et al. | |
| 2010/0318761 A1 | 12/2010 | Moyer et al. | |
| 2011/0057937 A1 | 3/2011 | Wu et al. | |
| 2011/0231630 A1 | 9/2011 | Dannowski et al. | |
| 2011/0296407 A1 | 12/2011 | Bhandari et al. | |
| 2012/0060171 A1 | 3/2012 | Bobroff et al. | |
| 2012/0079290 A1 | 3/2012 | Kumar et al. | |
| 2012/0084777 A1 | 4/2012 | Jayamohan | |
| 2012/0134320 A1 | 5/2012 | Khawer et al. | |
| 2012/0144217 A1 | 6/2012 | Sistla et al. | |
| 2012/0198266 A1 | 8/2012 | Hofmann et al. | |
| 2012/0317568 A1 | 12/2012 | Aasheim | |
| 2013/0117549 A1 | 5/2013 | Lin | |
| 2013/0132972 A1 | 5/2013 | Sur et al. | |
| 2013/0155081 A1 | 6/2013 | Khodorkovsky et al. | |
| 2013/0160003 A1 | 6/2013 | Mann et al. | |
| 2013/0185570 A1 | 7/2013 | Kumar et al. | |
| 2014/0100706 A1 | 4/2014 | Khatri et al. | |
| 2014/0189297 A1 | 7/2014 | Narvaez et al. | |
| 2014/0189299 A1 | 7/2014 | Narvaez et al. | |
| 2014/0189377 A1 | 7/2014 | Subbareddy et al. | |
| 2014/0189704 A1 | 7/2014 | Narvaez et al. | |
| 2015/0286550 A1 | 10/2015 | Naffziger et al. | |

FOREIGN PATENT DOCUMENTS

| | | |
|---|---|---|
| TW | 388846 B | 5/2000 |
| TW | 591603 B | 6/2004 |
| WO | 9635177 A1 | 11/1996 |
| WO | 2012134431 A1 | 10/2012 |
| WO | 2012170746 A2 | 12/2012 |
| WO | 2013036222 A1 | 3/2013 |
| WO | 2013101139 A1 | 7/2013 |
| WO | 2013162589 A1 | 10/2013 |
| WO | 2014105145 A1 | 7/2014 |
| WO | 2014105169 A1 | 7/2014 |
| WO | 2014105174 A1 | 7/2014 |
| WO | 2014105197 A1 | 7/2014 |

OTHER PUBLICATIONS

Final Office Action from U.S. Appl. No. 13/854,001, dated Dec. 21, 2015, 16 pages.
Final Office Action from U.S. Appl. No. 13/730,493, dated Nov. 16, 2015, 10 pages.
Final Office Action from U.S. Appl. No. 13/730,539, dated Jun. 26, 2015, 9 pages.
Final Office Action from U.S. Appl. No. 13/854,001, dated Dec. 2, 2016, 19 pages.
Freeh, et al., "Scaling and Packing on a Chip Multiprocessor," Workshop on High-Performance, Power-Aware Computing, IEEE, Mar. 26, 2007, pp. 1-8.
International Preliminary Report on Patentability for Application No. PCT/US2013/046634, dated Jul. 9, 2015, 9 pages.
International Preliminary Report on Patentability for Application No. PCT/US2013/047434, dated Jul. 9, 2015, 8 pages.
International Preliminary Report on Patentability for Application No. PCT/US2013/047700, dated Jul. 9, 2015, 6 pages.
International Preliminary Report on Patentability for Application No. PCT/US2013/048352, dated Jul. 9, 2015, 6 pages.
International Search Report and Written Opinion for Application No. PCT/US2013/046634, dated Aug. 30, 2013, 12 pages.
International Search Report and Written Opinion for Application No. PCT/US2013/047700, dated Sep. 27, 2013, 9 pages.
International Search Report and Written Opinion for Application No. PCT/US2013/048352, dated Nov. 1, 2013, 13 pages.
International Search Report for Application No. PCT/US2013/047434, dated Oct. 10, 2013, 4 pages.
Lee, et al., "Debunking the 100X GPU vs. CPU Myth: An Evaluation of Throughput Computing on CPU and GPU," ISCA'10, Jun. 19-23, 2010, 10 pages.
Non-Final Office Action from U.S. Appl. No. 13/854,001, dated Jun. 19, 2015, 16 pages.
Non-Final Office Action from U.S. Appl. No. 13/730,491, dated Sep. 25, 2015, 9 pages.
Non-Final Office Action from U.S. Appl. No. 13/730,493, dated Apr. 13, 2015, 9 pages.
Non-Final Office Action from U.S. Appl. No. 13/730,493, dated Feb. 3, 2016, 9 pages.
Non-Final Office Action from U.S. Appl. No. 13/730,539, dated Feb. 23, 2015, 12 pages.
Non-Final Office Action from U.S. Appl. No. 13/730,539, dated Sep. 16, 2015, 13 pages.
Non-Final Office Action from U.S. Appl. No. 13/730,565, dated Sep. 8, 2015, 13 pages.

(56) References Cited

OTHER PUBLICATIONS

Non-Final Office Action from U.S. Appl. No. 13/854,001, dated May 20, 2016, 25 pages.
Notice of Allowance from U.S. Appl. No. 13/730,539, dated Jan. 12, 2016, 16 pages.
Notice of Allowance from U.S. Appl. No. 13/854,001, dated Apr. 5, 2017, 7 pages.
Office Action from foreign counterpart Great Britain Patent Application No. GB1404549.6, dated Sep. 11, 2014, 8 pages.
Office Action from foreign counterpart Japanese Patent Application No. 2014-052039, dated Mar. 17, 2015, 5 pages.
Office Action from foreign counterpart Korean Patent Application No. 10-2014-0031255, dated Aug. 17, 2015, 12 pages.
Written Opinion for Application No. PCT/US2013/047434, dated Oct. 10, 2013, 7 pages.

\* cited by examiner

METHOD FOR BOOTING A HETEROGENEOUS SYSTEM AND PRESENTING A SYMMETRIC CORE VIEW

CROSS-REFERENCE

The present application is related to, and claims the benefit of non-provisional U.S. application Ser. No. 13/854,001 filed Mar. 29, 2013, now U.S. Pat. No. 9,727,345, which claims the benefit of provisional Application Ser. No. 61/801,615 filed Mar. 15, 2013, which is herein incorporated by reference.

BACKGROUND

Field of the Invention

This invention relates generally to the field of computer processors. More particularly, the invention relates to an apparatus and method for initializing and booting a heterogeneous processor.

Description of the Related Art

Modern handheld devices have both power consumption and thermal dissipation constraints due to their small size, yet consumers are expecting increasingly advanced functionality that requires increasingly advanced computational power. To provide both decreased power consumption and increased computational resources, heterogeneous processors can be employed. Heterogeneous computing architectures provide unique advantages over homogenous architectures because more than one type of compute element is available to perform computation tasks, which allows lower intensity computational tasks to be performed by a power efficient compute elements, while higher intensity computational tasks are performed on more powerful compute elements.

In spite of the well-known advantages of heterogeneous computing architectures, there are few examples of heterogeneous computing for CPU cores in the real world. These architectures require software to know how to schedule tasks appropriately to each CPU core types (in this case the compute elements are CPU cores). As hardware evolves and core types change, it is very difficult for software (e.g., operating systems) to keep track of the different types of CPU cores which are available and how to harness heterogeneity effectively.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures and Data Types

Figure 1:
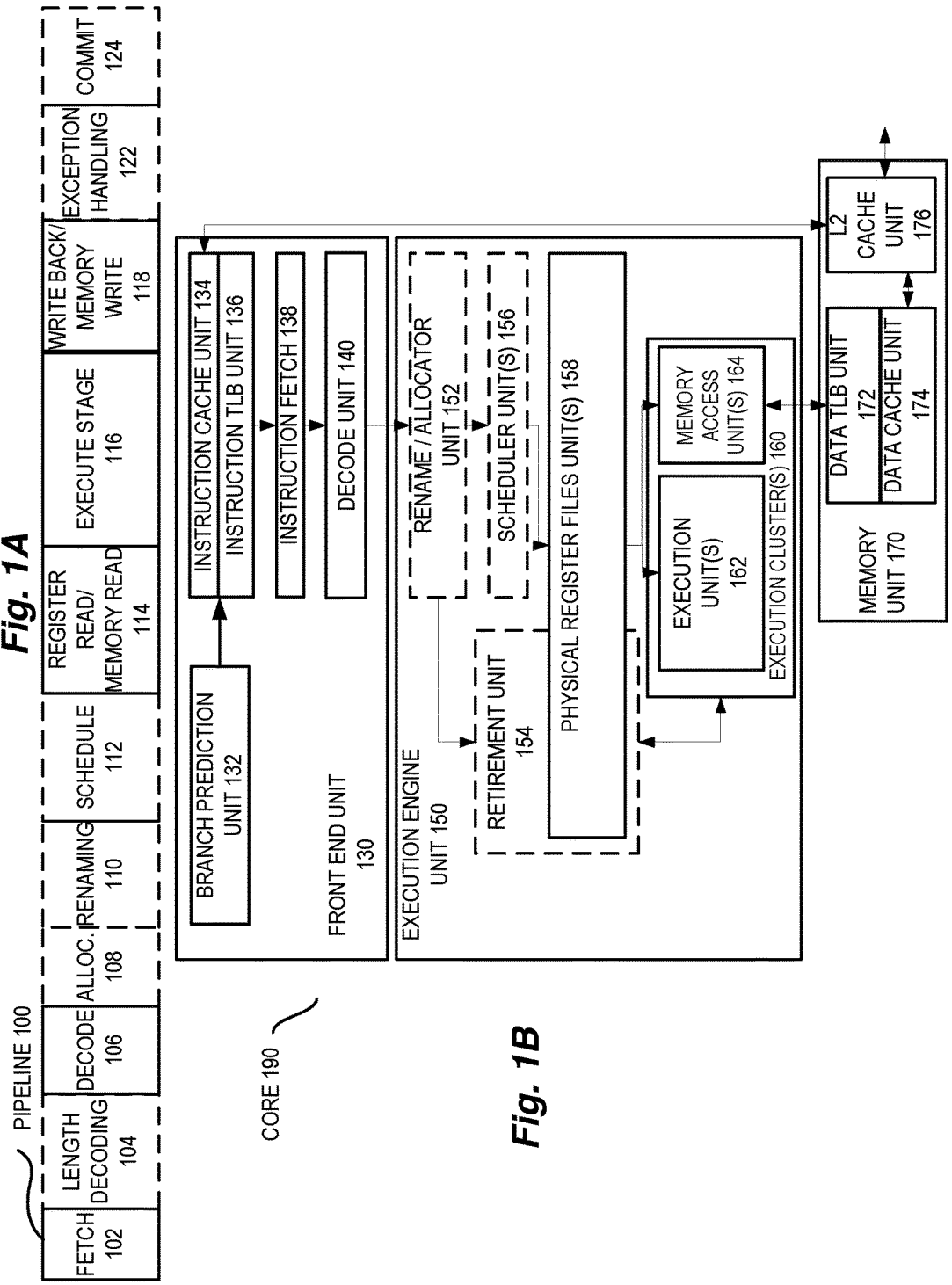
FIG. 1A is a block diagram illustrating both an exemplary in-order pipeline and an exemplary register renaming, out-of-order issue/execution pipeline according to embodiments of the invention.
FIG. 1B is a block diagram illustrating both an exemplary embodiment of an in-order architecture core and an exemplary register renaming, out-of-order issue/execution architecture core to be included in a processor according to embodiments of the invention.

FIG. 1A is a block diagram illustrating both an exemplary in-order pipeline and an exemplary register renaming, out-of-order issue/execution pipeline according to embodiments of the invention. FIG. 1B is a block diagram illustrating both an exemplary embodiment of an in-order architecture core and an exemplary register renaming, out-of-order issue/execution architecture core to be included in a processor according to embodiments of the invention. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front-end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general-purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster— and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
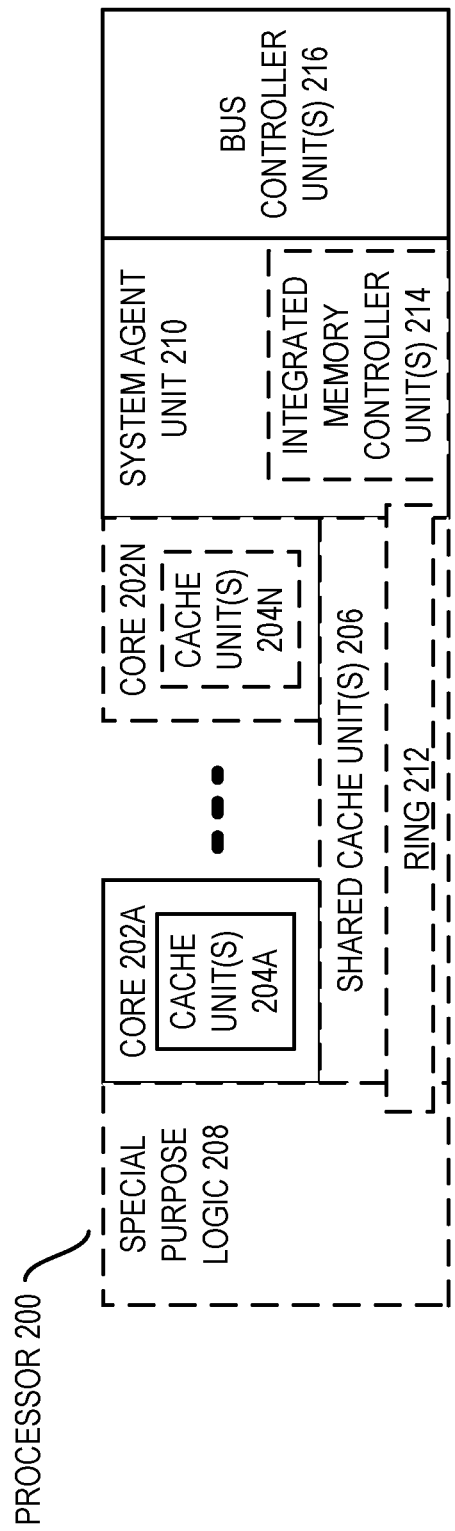
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multithreading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
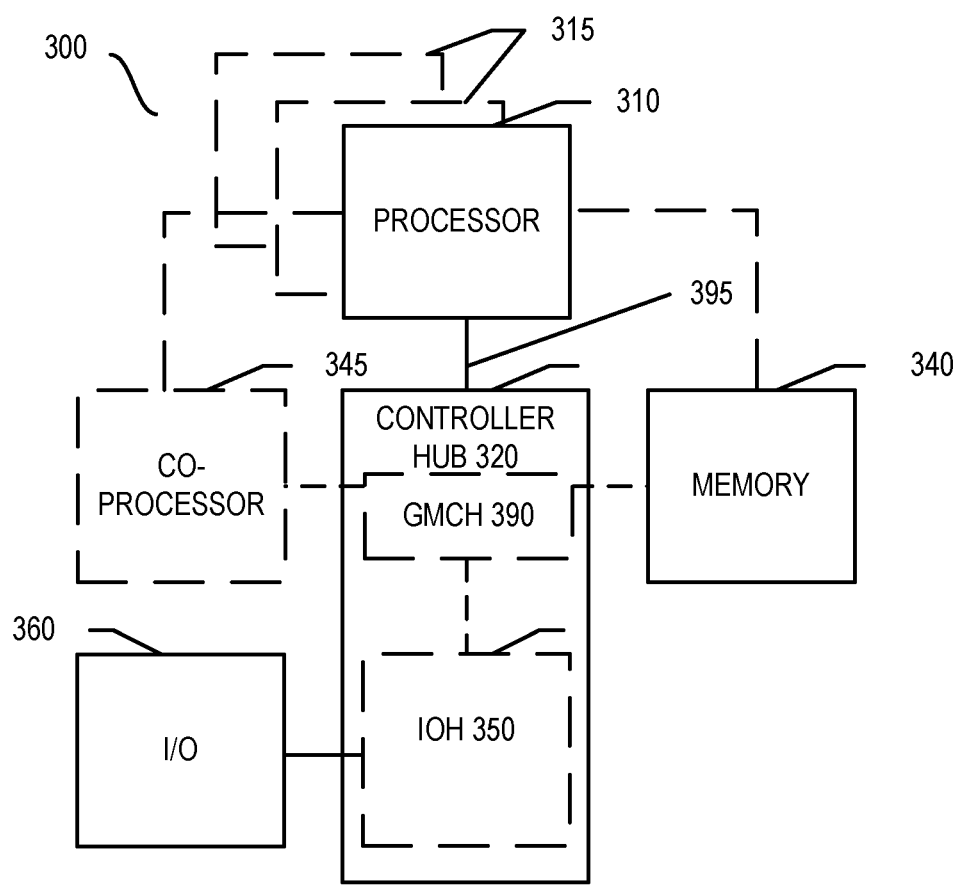
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
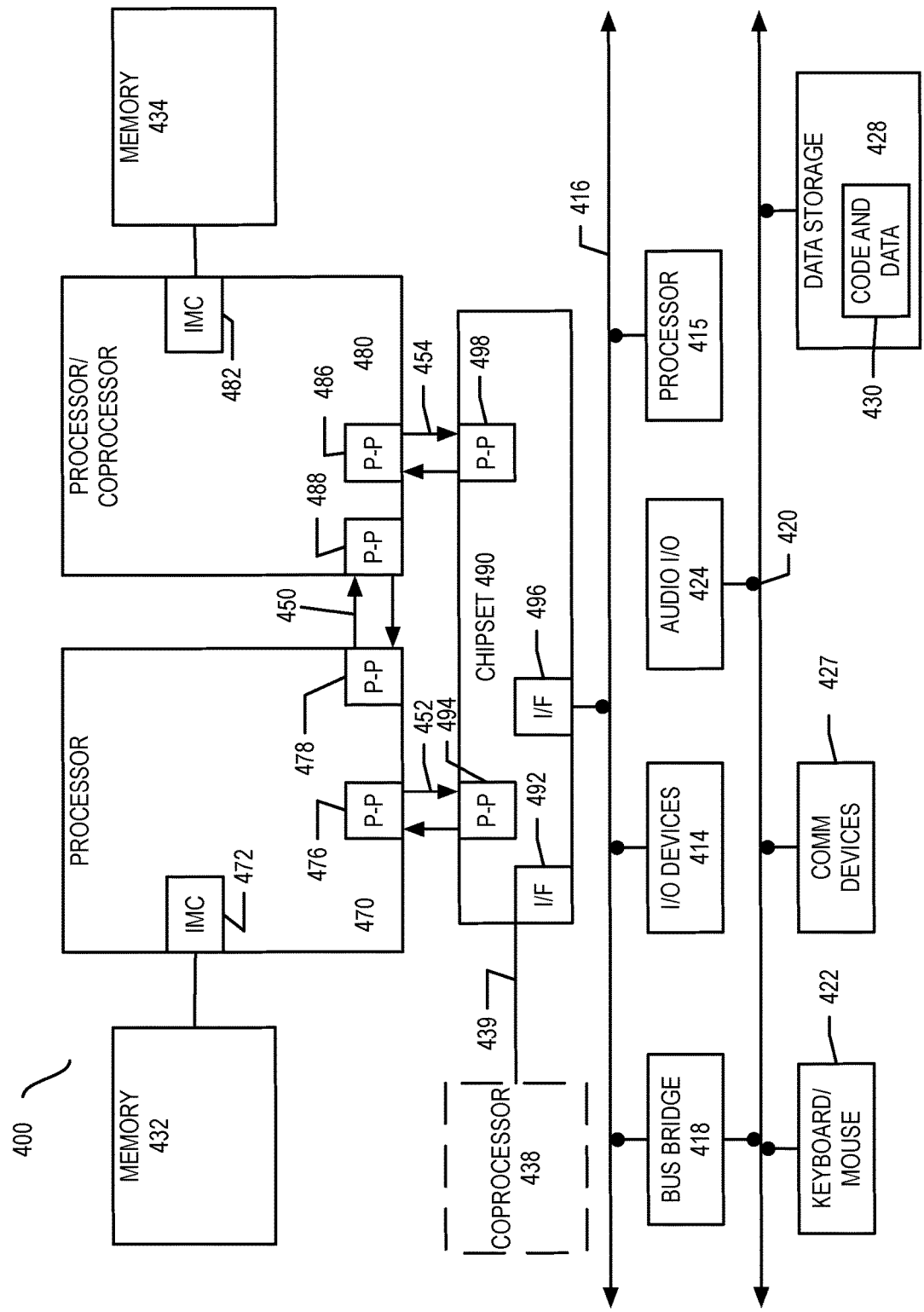
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point-to-point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418, which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device, which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
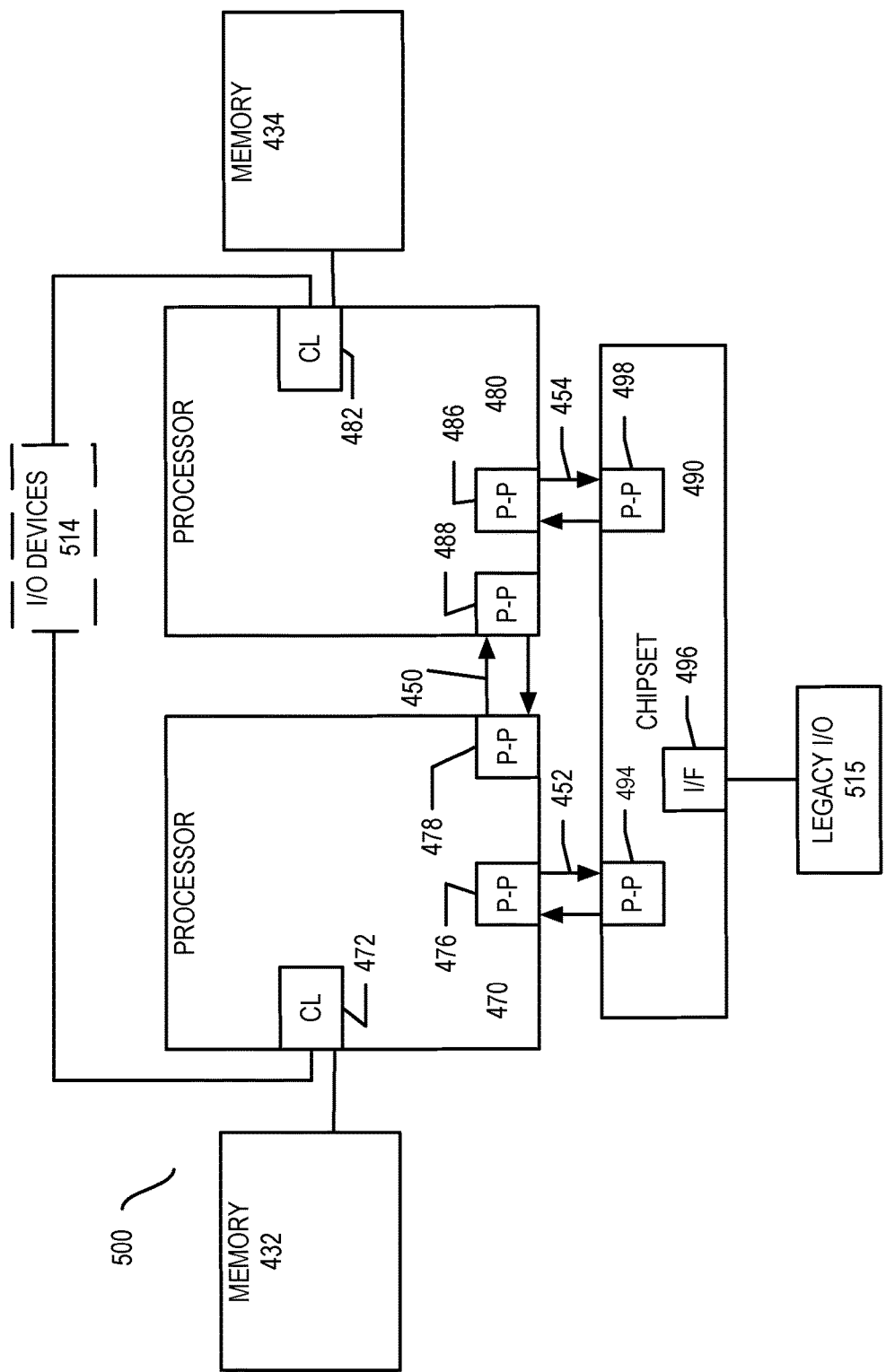
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
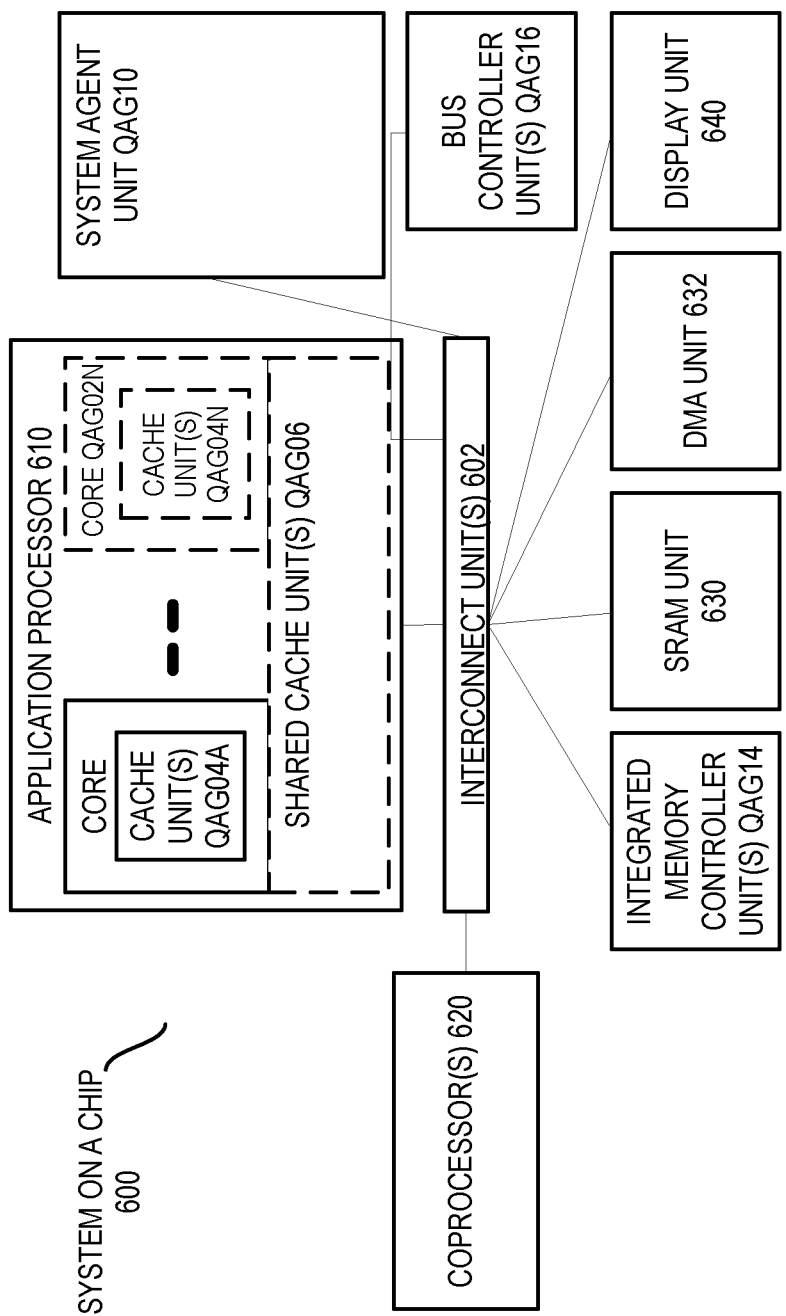
FIG. 6 illustrates a block diagram of a system on a chip (SoC) in accordance with an embodiment of the present invention.

FIG. 6 shows is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), rewritable compact disks (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
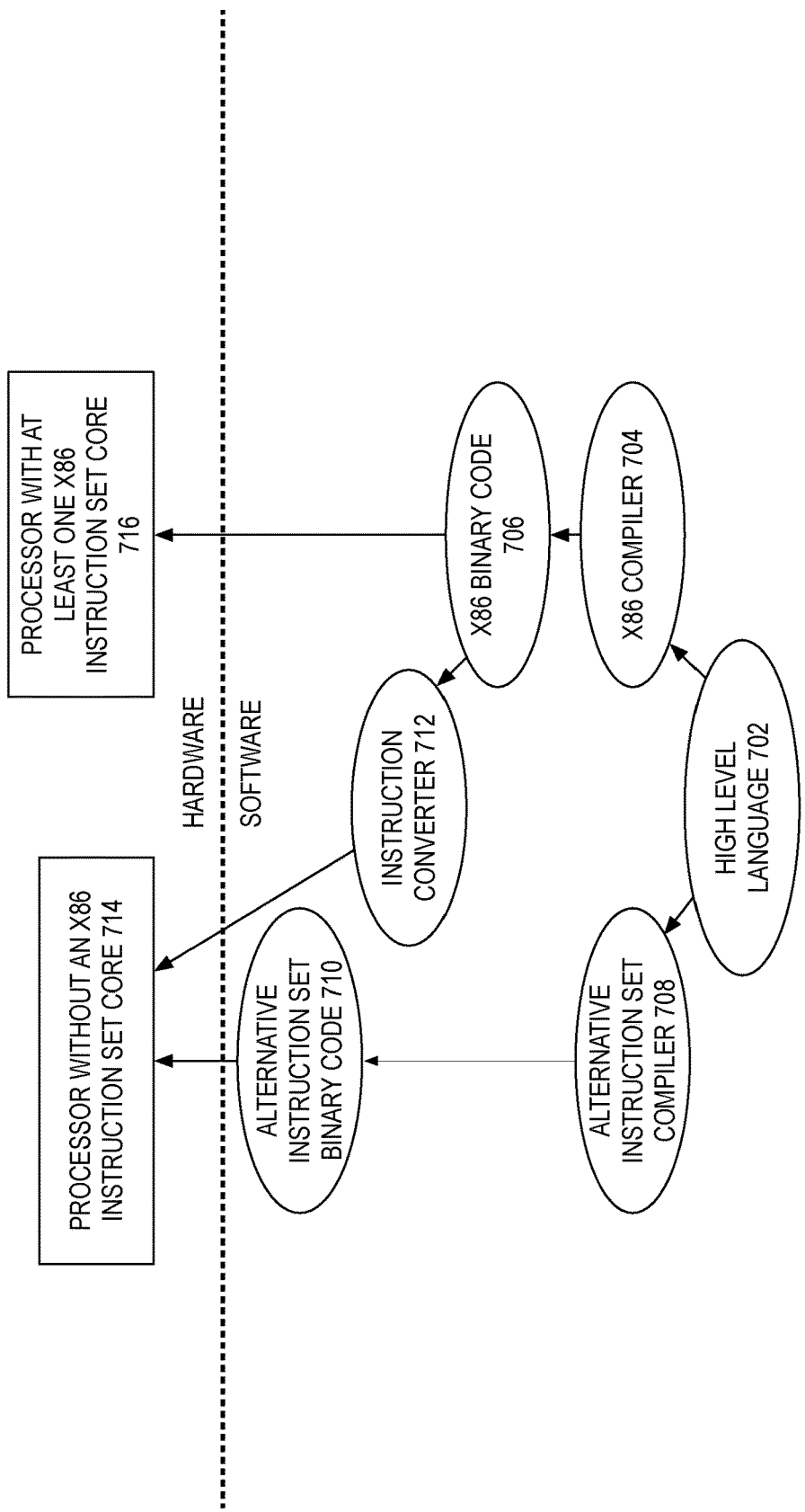
FIG. 7 illustrates a block diagram contrasting the use of a software instruction converter to convert binary instructions in a source instruction set to binary instructions in a target instruction set according to embodiments of the invention.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Cambridge, UK). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

System-Transparent Heterogeneous Computing

The embodiments of the invention described below overcome the lack of support for heterogeneity in a system firmware interface and operating system (OS) by hiding it entirely from the system, and integrating all heterogeneity-aware logic and heuristics within the processor. Whereas, in a conventional CPU, the assignment of tasks to cores is done exclusively by software (typically by the OS), in one embodiment of the invention this assignment is broken down into two parts. Software continues to schedule software processes to the exposed homogeneous cores, while hardware dynamically swaps threads between the exposed cores, and the hidden heterogeneous cores.

By exposing only homogeneous compute elements to the system, the heterogeneous nature of the hardware is entirely hidden from the software, including the system firmware interface (e.g., BIOS, EFI, or UEFI) and the OS and almost for all of the possible application level S/W. The system therefore boots and operates as if it were running on a processor with homogeneous cores only. The processor hardware of this embodiment includes logic to dynamically map each of the compute elements exposed to the software to one or more of the hidden physical compute elements available. Additionally, the logic maintains a consistency of operation in each type of processor and the ability to migrate the work between the various core types. The specific mechanism by which the hardware dynamically chooses the physical compute elements is transparent to the system.

By including a heterogeneous selection of compute elements, the processor hardware can always operate very efficiently in very different operating conditions with very different types of computational tasks. For example, a CPU that contains both a small, power-efficient core and a big, high-performance core can be used to run software efficiently at times when power is limited (and performance is not critical) and also at other times when high performance is needed (but power is not limited). The selection of different combinations of compute elements within the hardware is based on the design requirements of which types of tasks need to run on the system and under which conditions.

Heterogeneous systems may contain different types of compute elements, such as processor cores, graphics processor units (GPUs), and fixed function accelerators (e.g., for accelerating common functions such as sorts and loops). In the embodiments of the invention set forth below, the heterogeneous systems have different types of processor cores—i.e., a few high-performance cores and a larger number of small power-efficient cores. However, the underlying principles of the invention may be employed with other types of compute elements.

Figure 8:
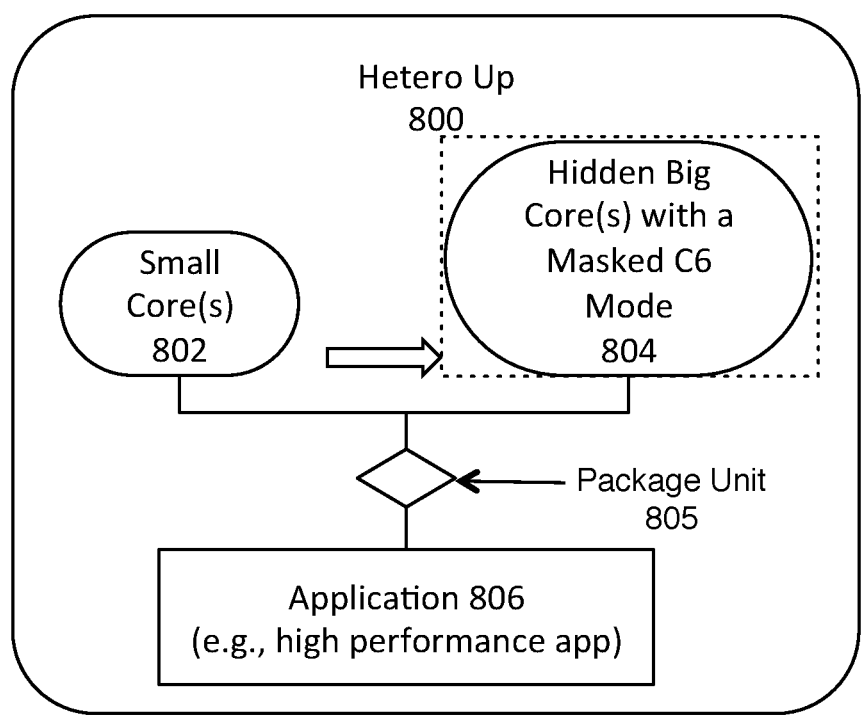
FIG. 8 illustrates one embodiment of a heterogeneous core computing architecture.

FIG. 8 illustrates one embodiment of a heterogeneous core computing architecture, referred to herein as "Hetero-UP" 800. In the Hetero-UP 800 configuration small power-efficient cores 802 are exposed to software. When additional performance is needed by an application 806, and where sufficient power budget is available, a virtual to physical core mapping can transparently swap threads from the small power-efficient core 802 to a high-performance big physical core 804 to run in place of the small core. In one embodiment, a package unit 805 manages the group of heterogeneous processor cores, to determine which processor cores are enabled and disabled based on a power profile, and computational throughput demands. For the purposes of describing the boot process of heterogeneous core computing implementation below, the Hetero-UP 800 embodiment will be illustrated as an exemplary, but non-limiting example.

For the Hetero-Up 800 embodiment, the firmware interface will only able to enumerate the platform processors as small cores. The big core will be hidden from the software, and not able to be enumerated with conventional enumeration methods, such as CPUID. It should be noted, however, that other embodiments of a heterogeneous core computing implementation are possible, such as a Hetero-Down configuration, in which a high-performance big physical core 804 is visible, while small power-efficient cores 802 are hidden. In this case, the firmware interface will enumerate the big core processor.

In one embodiment, specialized software tools, such as processor debug tools, are able to identify the type of physical cores available, even if the firmware interface and OS are not hetero processing system aware. The specialized software tools are able to disable or enable the ability to switch between cores, and can perform actions such as force switching a thread from one core type to different core type.

While transparent heterogeneous computing causes increased complexity in the design and development of processor hardware, it offers numerous advantages to firmware interface and OS developers. First, the firmware interface, OS, or application software does not need to know that the CPU has heterogeneous cores (or other compute elements), which means that legacy software, including operating systems, will continue to work with the described hardware. Similarly, future operating systems and software applications will not need to be constantly updated to reflect the type of heterogeneity on every version of hardware.

Second, all of the heuristics implemented by virtual to physical core mapping logic is contained within the hardware, or contained within the software or firmware bundled with the hardware, or otherwise provided by the processor vendor. Consequently, future hardware designs may create more aggressive and innovative compute element choices since the full extent of the changes are hidden from software and do not require software updates.

Boot Flow for Transparent Heterogeneous Computing

Current heterogeneous computing solutions may require both firmware interface and operating system (OS) to be aware of the heterogeneous cores with the associated software complexity. However, it is possible to present a processor interface such that the firmware interface and OS operate as though they executing on a single type of core, when they are actually executing on one or more heterogeneous cores. One method is to use a microcode layer to "emulate" the behavior of the other types of cores. An additional method is to utilizing special microcode and package level hardware assist to migrate the executing thread to the proper execution core (e.g., low power or high performance).

At system startup, the type of core exposed to the system determines the boot flow executed by the firmware interface. During firmware interface initialization, the hidden cores are dormant, and cannot be used by the system except using specialized microcode routines. Once the OS is initialized, the other core types can be used to execute the necessary initialization flow. If the OS is heterogeneous processing system aware, the heterogeneous processor cores are made visible to the OS, which can schedule tasks on each of the different processor core types directly. In one embodiment, a heterogeneous aware OS abstracts the heterogeneous nature of the processors to software running on the OS, via emulation or virtual processors, which provide a homogeneous abstraction layer to executing software.

If the OS is not heterogeneous processing system aware, hidden cores can be utilized using dynamic core swapping functionality, which allows the heterogeneous processor to dynamically swap executing threads between the various cores. Using that method, software believes it executes on the type core that is visible the software, regardless of which core on which the software is actually executing. To further facilitate system transparency, a new "Masked C6" processor state is provided, in which a processor core is placed into a low power state in which the processor core consumes nearly zero power, and in which the processor core is made invisible to the system software. A processor core in the Masked C6 state cannot be accessed by standard system triggers, and is instead accessible via specialized microcode routines.

To simplify the explanation below, a Hetero-UP 800 system is used to describe exemplary boot flow, and the system visible cores are the power efficient small cores 802, which implement a subset of the high-performance big physical cores 804, and consume less power. However, it should be appreciated that embodiments are not so limited, as the description below is agnostic to the core types, how many of them exist on the processor and which type is visible to firmware interface and OS.

Figure 9A:
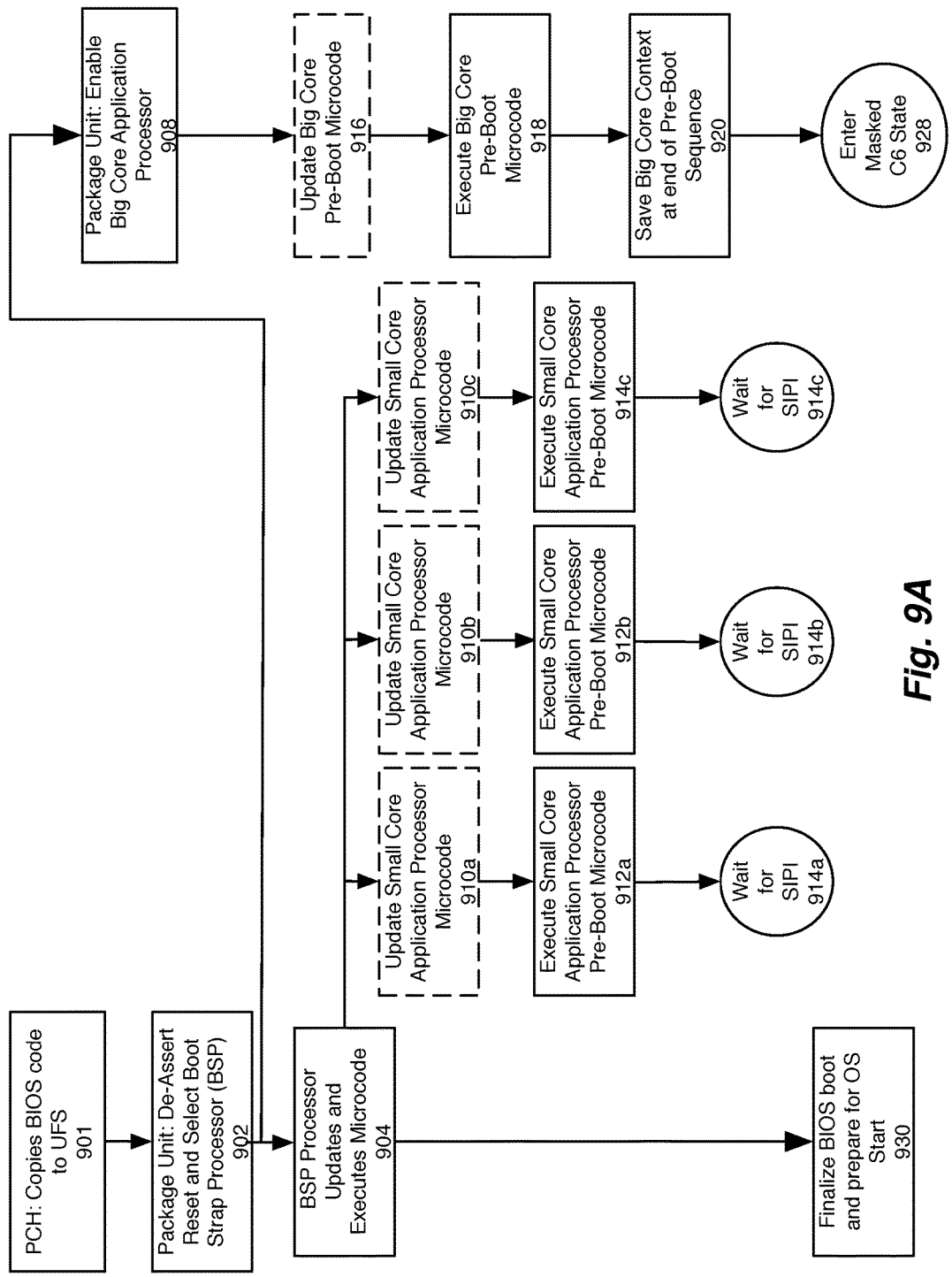
FIGS. 9A and 9B are flow diagrams of an overview of system boot flow according to an embodiment.
Figure 9B:
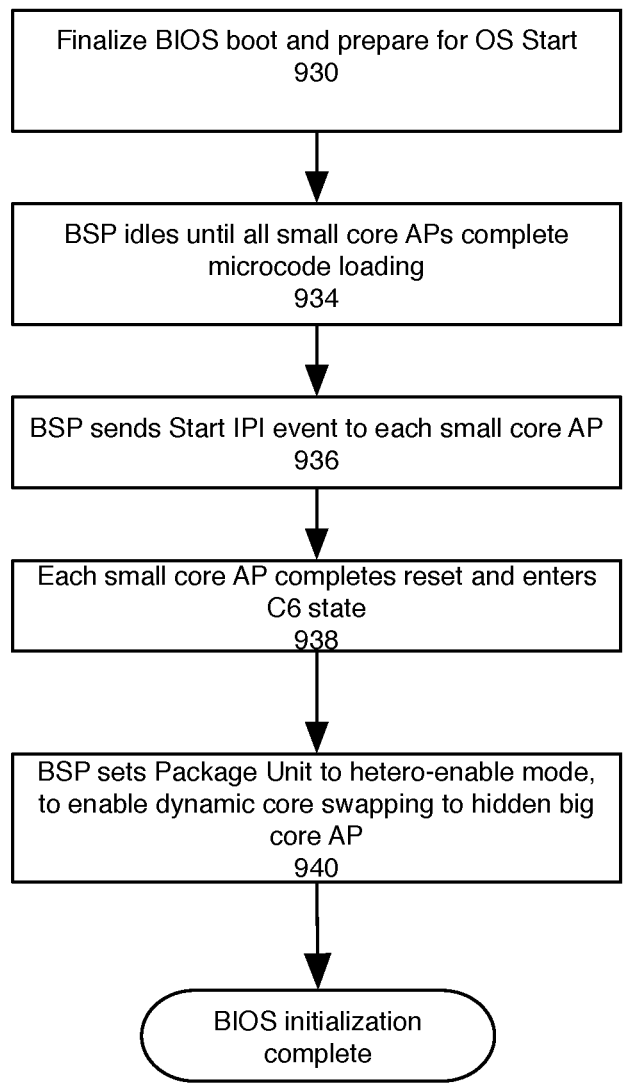

FIGS. 9A and 9B are flow diagrams of an overview of system boot flow on a Hetero-UP configuration, according to an embodiment. Beginning in FIG. 9a, at 901, a Platform Controller Hub (PCH) prepares for system boot by copying firmware interface code into a microcode accessible memory space, such as Universal Flash Storage (UFS), or some other processor executable memory space. At 902, a package hardware unit (e.g., package unit 805 of FIG. 8) takes all small cores out of reset, makes each small core visible to the system firmware interface, and selects one of the power efficient small cores to become a bootstrap processor (BSP). At 904, the small core processor selected to become the BSP updates and executes its microcode. The BSP microcode includes instructions to enable the additional small core processors that will be used as application processors.

The BSP microcode may include a firmware interface startup module, which the BSP loads during first boot step. The BSP communicate to the other processors via the use of inter-processor interrupts (IPI). Optionally, at 910a, 910b, and 910c, the BSP uses inter processor interrupts (IPI) to trigger each small core AP to load any available pre-boot microcode. As shown at 912a, 912b, and 912c, each small core AP executes their respective application processor pre-boot microcode, which includes initializes machine check support. In one embodiment, previous machine check events that are not handled by the small core APs are logged, and new machine check events are handled once machine check support is enabled. At 914a, 914b, and 914c, each small core AP enters an idle state, to await a startup IPI (SIPI) from the BSP Concurrently with the small core application processor initialization, a big core application processor with a superset of the small core application processors is enabled and initialized by the package unit, as shown at 908. In one embodiment, one or more big cores are available in hardware, but are disabled via an internal fuse, in which case, the big core is not initialized.

At 916, the BSP prepares to start the high performance big core AP, which includes an optional loading of an update patch for the big core pre-boot microcode. At 918, the big core executes pre-boot microcode to ready the core for instruction execution. At 920, the big core processor completes the pre-boot sequence, and save the readied processor context. At 928, the big core notifies the BSP the big core initialization sequence is complete, and enters Masked C6 state. At this point, the BSC finalizes the firmware interface boot and prepares the OS start, as shown at block 930, and further illustrated in FIG. 9b.

Referring to FIG. 9b, once the system firmware interface module executing on the BSP completes, the BSP waits for any small core APs that have not completed loading their microcode update, as shown at 934. At 936, The BSP sends an SIPI event to each of the small core APs. At 938, each small core AP completes their reset cycle and enters a standard C6 state. At this point, a small core bootstrap processor, and small core application processors are available, each visible to the system, while the big core remains in the Masked C6 state. At 940, the BSP sets the package unit to hetero-enable mode, which allows the processor to dynamically swap threads to the hidden heterogeneous core.

Once initialization of the firmware interface is complete, the OS initialization routines can begin. If the OS does not support heterogeneous processor systems, the OS may schedule tasks on a small core AP, and the processor hardware can automatically swap tasks from the one of the small core APs to a big core AP. From the software perspective, the system runs in a completely homogenous state. The hidden big core is masked, and does not expose software visible state on the system. For example, on an OS which does not support heterogeneous processor systems, the hidden big core does not have a visible advanced programmable interrupt controller ID, does not accept direct software initiated inter-processor interrupts, and does not handle machine check events as big core. In one embodiment, one or more hidden cores of the heterogeneous processing system are exposed to a non-heterogeneous aware OS by emulating the instruction set of the visible homogeneous cores. If the OS supports heterogeneous processor systems, the OS can expose each of the various core types to software, and can schedule software tasks on the various core types. Additionally, a heterogeneous aware OS can control the hardware mechanism used to swap threads between cores.

Figure 10:
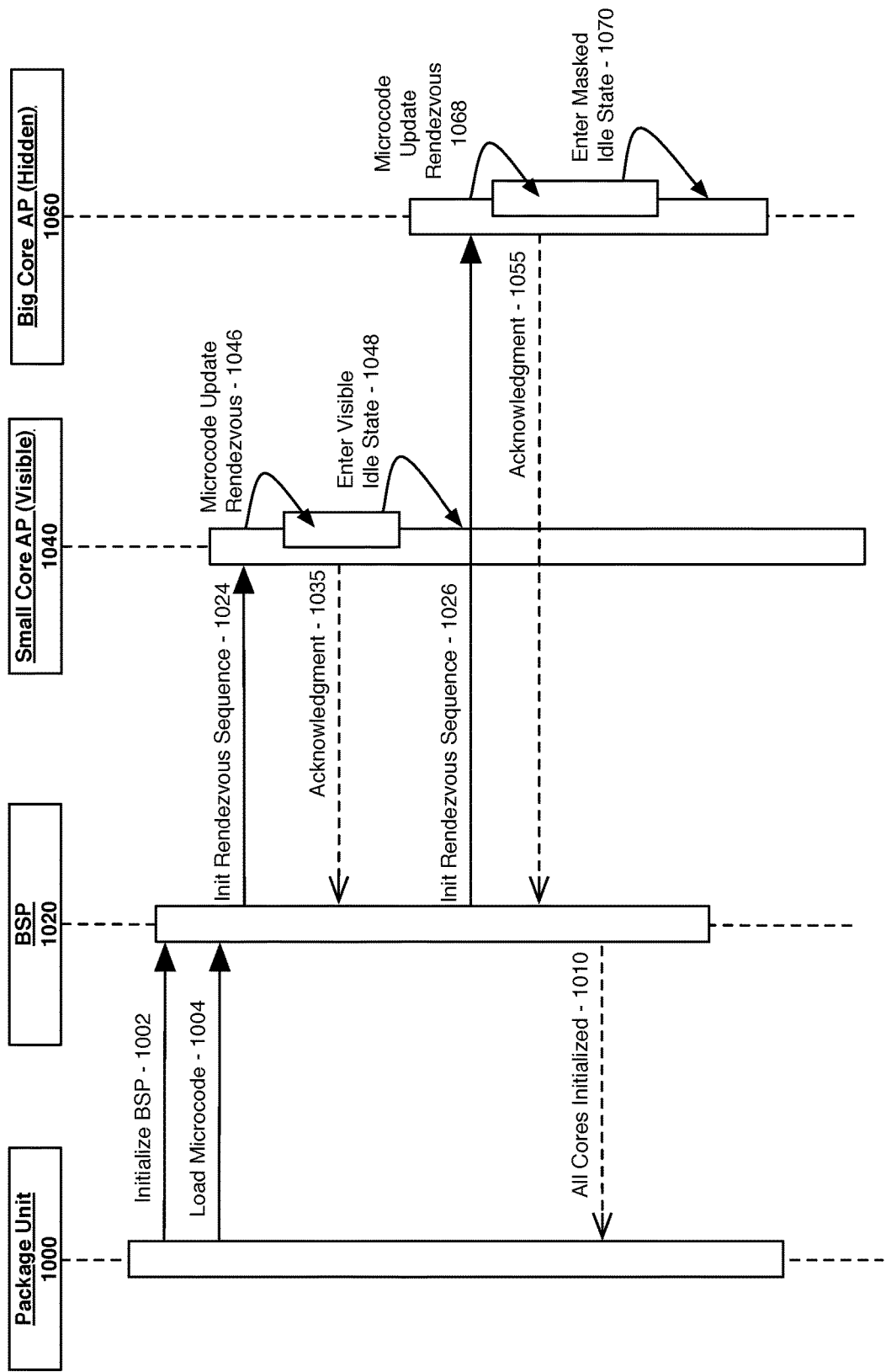
FIG. 10 is a sequence diagram illustrating data and message passing between firmware and microcode elements according to an embodiment.

FIG. 10 is a sequence diagram illustrating data and message passing between firmware and microcode elements of one embodiment of a heterogeneous processing system boot sequence. In one embodiment, as shown at 1002, a set of firmware interface instructions executed by package unit firmware 1000 sends an initialize bootstrap processor (BSP) message to the small core processor selected to become the BSP 1020. The package unit 1000 triggers a microcode update and load 1004 trigger for the BSP 1020, when then proceeds to enable the remaining small core application processors 1040, which will be visible to the system. An initialize rendezvous sequence 1024 including a microcode update is sent to each small core application processor 1040 that is visible to the system, which causes each small core AP to enter into a rendezvous state.

In the rendezvous state, each processor core of a multi-core or multi-processor system relinquishes control to a single core or processor, which can manage initialization, or perform error handling for all processors in the system. Responsive to receiving the initialization rendezvous sequence 2024 fro the BSP 1020, the visible small core application processors 1040 enter into microcode update rendezvous sequence 1046, to load an execute the microcode for each processor. Once initialized, each small core AP 1040 sends an acknowledgement message 1035 to the BSP 1020, and then enters a system visible idle state 1048 (e.g., standard C6 mode).

The BSP 1020, concurrently with the initialization of the small core application processors, sends an initialization rendezvous sequence 1026 to one or more hidden big core application processors 1060. The one or more big core application processors 1060 enter a microcode update rendezvous state 1068, to load the microcode for each big core 1060. The one or more big core application processors 1060 sent an acknowledgement message 1055 to the BSP 1020 when complete, and enter a masked C6 idle state 1070, in which the big core application processor 1060 is invisible to the firmware interface and OS. Once all cores are initialized, the BSP 1020 notifies the package unit 1000 that all cores are initialized 1010, and the system prepares to load the OS. In one embodiment, the OS is heterogeneous processing system aware, and upon OS initialization, the big core application processor 1060 becomes OS visible, and is available for core switch operations along with the small core application processors 1040. In one embodiment, the OS is not heterogeneous processing system aware, and the heterogeneous processing system enables big core application processor utilization transparently, without the direction of the OS.

Figure 11A:
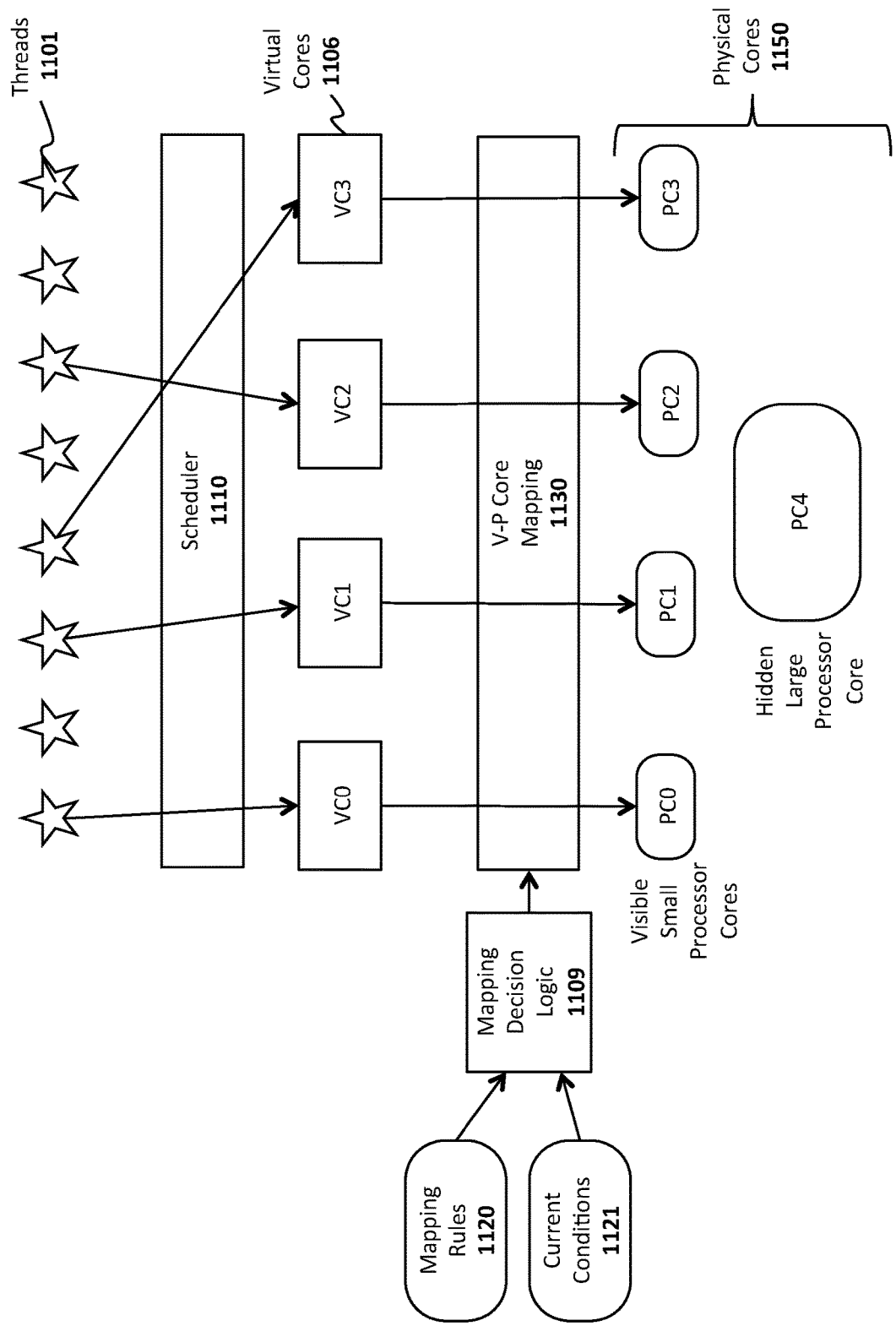
FIGS. 11A-11B illustrate one embodiment of a system with a hidden large core and multiple visible small cores.
Figure 11B:
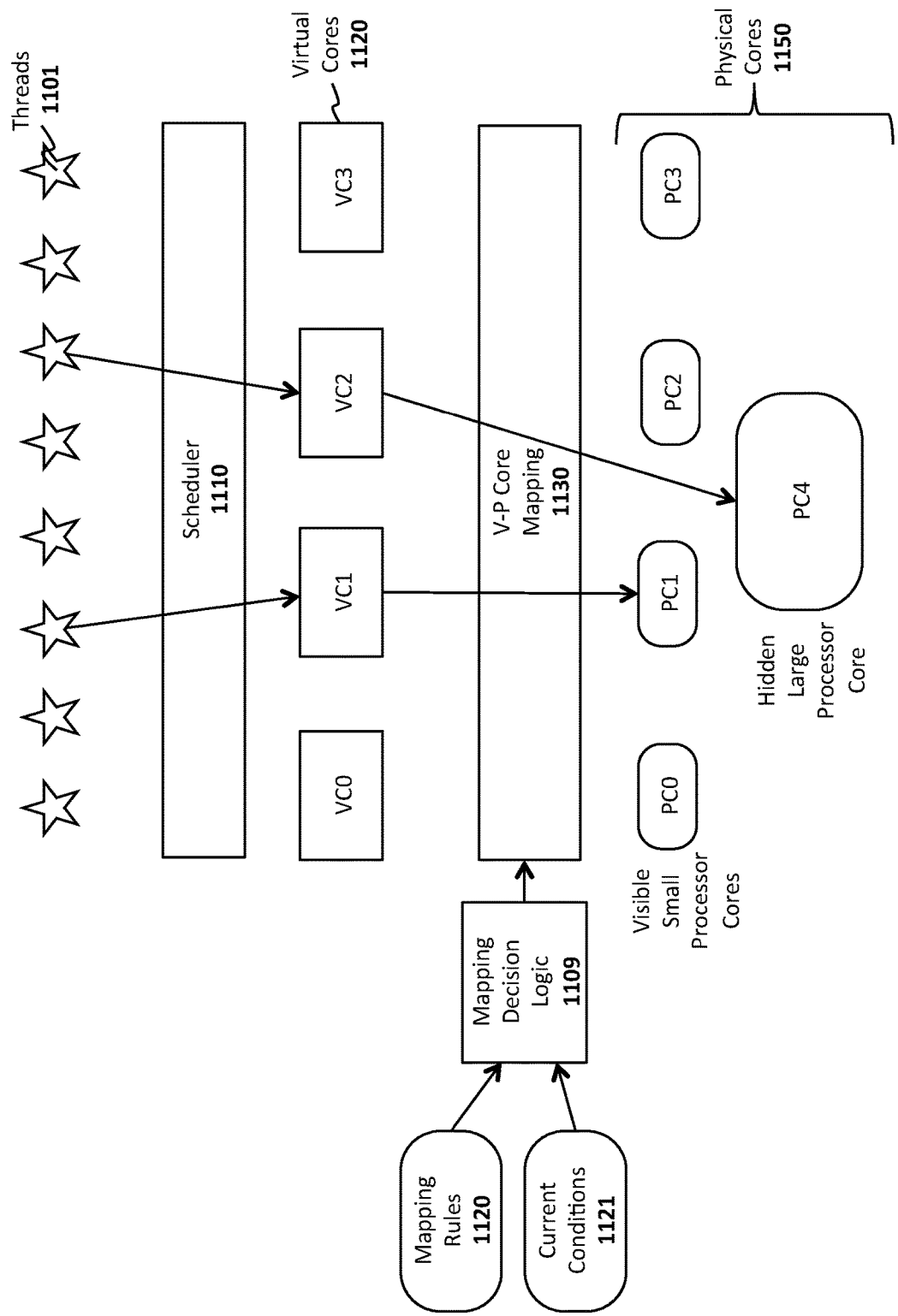

FIGS. 11A-B illustrate how one embodiment of the invention transparently swaps a small core with a big core when needed. In one embodiment, hiding the heterogeneity from system firmware interface, and integrating all heterogeneity-aware logic and heuristics within the processor enables transparent support for heterogeneity. In a conventional CPU, the assignment of tasks to cores is done exclusively by software (typically by the OS). However, in one embodiment, this assignment is broken down into two parts. Software continues to schedule software processes to the homogeneous "virtual cores" exposed by the processor, while hardware dynamically selects which physical core type implements a given virtual core. Software scheduling algorithms intended to maximize throughput, performance, or other metric continue to work, while hardware performs another (transparent) layer of optimization, where the processes/threads running on each virtual core are directed to whichever physical core is best suited for the type of workload running on that virtual core As illustrated in FIG. 11A, the processor hardware contains a number of heterogeneous physical cores, PC0-PC4 1150 which include a set of small cores PC0-PC3 and one large core PC4. In this embodiment, homogeneous virtual cores VC0-VC3 1106 are exposed to software. Notwithstanding the various physical core types within the system, the virtual cores are each presented as a single type of core; in this case, the small core type. Consequently, a software-based scheduler 1110 (which may be part of an OS) schedules threads 1101 for execution on each of the exposed homogeneous virtual cores 1106 just as it would in a true homogeneous multi-core processor or multi-processor system. Virtual-to-physical (V-P) mapping logic 1130 maps each virtual core 1120 to one or more appropriate physical cores 1150 according to a set of mapping rules 1140 and based on currently detected conditions 1141. As described above, the mapping decisions may be performed by mapping decision logic 1109 which may be implemented in software, hardware, firmware, or any combination thereof.

In one embodiment, a default 1:1 mapping between the virtual cores 1106 and the small cores PC0-PC3 is present. Consequently, the small cores PC0-PC3 are effectively made visible to the software-based scheduler. In one embodiment, when the system has a low utilization (below a specified threshold) and/or when most small cores are busy (e.g., with a high processing load above a specified threshold), this default mapping is maintained. For example, in one embodiment, when the system has a low utilization (e.g., no core exceeds 60% activity) or when most small cores are busy (e.g., more than 75% of the total available cores are more than 60% active), this default mapping is maintained.

However, in one embodiment, when the system has a large number of idle cores (e.g., more than 50% of all available cores) and a few (one or more) heavily loaded, very active cores, then the heuristic implemented by the mapping decision logic 1109 automatically changes the mapping as illustrated in FIG. 11B. Here, only two threads 1101 are being scheduled by the scheduler 1110 to virtual cores VC1 and VC2, and at least one of the virtual cores (VC2 in the example) has activity above a specified threshold. Consequently, in this example, the V-P core mapping logic 1130 has remapped the virtual core VC2 from the small physical core PC2 to the big physical core PC4 in response to the mapping decision rendered buy the mapping decision logic 1109.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.).

In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media.

Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well-known structures and functions were not described in elaborate detail in order to avoid obscuring the subject matter of the present invention. Accordingly, the scope and spirit of the invention should be judged in terms of the claims, which follow.

What is claimed is:

1. A processor comprising:
a first physical core having a first instruction set and a first power consumption level, to execute a thread at a first performance level;
a second physical core having a second instruction set and a second power consumption level, to execute a thread at a second performance level, the first and second cores being in a dynamic multi-core unit; and
a virtual-to-physical (V-P) mapping circuit coupled to the first and second physical cores, to map the first physical core to a system firmware interface via a virtual core and to hide the second processor core from the system firmware interface.

2. The processor as in claim 1 further comprising a third physical core having the first instruction set and the first power consumption level, wherein the V-P mapping circuit is to map a first virtual core to the first physical core and to map a second virtual core to the third physical core, to allow a set of threads to be executed in parallel across the first and third physical processor cores.

3. The processor as in claim 2 wherein the V-P mapping logic is to map the second virtual core to the second physical core transparently to the firmware interface in response to detected characteristics associated with the set of threads being executed.

4. The processor as in claim 3 wherein the first power consumption level is lower than the second power consumption level.

5. The processor as in claim 4 wherein the second performance level is higher than the first performance level.

6. The processor as in claim 5 wherein the second physical core is made accessible to software by the V-P mapping circuit by mapping one or more of the virtual cores to the second physical core.

7. The processor as in claim 1 wherein a single physical core of the processor acts as a bootstrap processor.

8. The processor as in claim 7 wherein the first physical core acts as the bootstrap processor.

9. The processor as in claim 8 wherein the bootstrap processor initializes the second physical core.

10. A method comprising:
providing a set of one or more small physical processor cores;
providing at least one large physical processor core having relatively higher performance processing capabilities and relatively higher power usage relative to the small physical processor cores;
exposing a set of two or more small physical processor cores to a system firmware interface; and
hiding the at least one large physical processor core from the system firmware interface.

11. The method as in claim 10 further comprising:
dynamically swapping a thread from a first small physical processor core to a large physical processor core, to allow the threads to be executed in on the large physical processor core, wherein the swapping is transparent to the thread.

12. The method as in claim 10 further comprising:
nominating a small physical processor core from the set of small physical processor cores as a bootstrap processor;
initializing, by the bootstrap processor, each processor in the set of small physical cores; and
initializing, by the bootstrap processor the at least one large physical core.

13. The method as in claim 12 wherein the small physical processor cores are exposed to the software through a default mapping between virtual processors and small physical processor cores.

14. The method as in claim 13 wherein the at least one large physical processor core is hidden from the system firmware interface and made accessible to an operating system by transparently mapping one or more of the virtual cores to the large physical processor cores.

15. The method as in claim 14 wherein the large physical processor is visible to an operating system having support for processor cores having multiple instruction sets.

\* \* \* \* \*